United States Patent
Rumpel et al.

(10) Patent No.: US 10,570,978 B2
(45) Date of Patent: Feb. 25, 2020

(54) SWITCHABLE BEARING BUSH FOR A MOTOR VEHICLE

(71) Applicant: SCHAEFFLER TECHNOLOGIES AG & CO. KG, Herzogenaurach (DE)

(72) Inventors: Peter Rumpel, Werneck/Schraudenbach (DE); Hartmut Krehmer, Erlangen (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 30 days.

(21) Appl. No.: 15/748,489

(22) PCT Filed: May 17, 2016

(86) PCT No.: PCT/DE2016/200233
§ 371 (c)(1),
(2) Date: Jan. 29, 2018

(87) PCT Pub. No.: WO2017/025086
PCT Pub. Date: Feb. 16, 2017

(65) Prior Publication Data
US 2018/0223936 A1 Aug. 9, 2018

(30) Foreign Application Priority Data
Aug. 13, 2015 (DE) .................. 10 2015 215 426

(51) Int. Cl.
*F16F 7/00* (2006.01)
*F16F 1/387* (2006.01)

(52) U.S. Cl.
CPC ............ *F16F 1/387* (2013.01); *F16F 1/3876* (2013.01); *F16F 2230/0058* (2013.01); *F16F 2230/18* (2013.01)

(58) Field of Classification Search
CPC ........ F16F 1/387; F16C 27/063; B60G 11/12; B60G 7/02
(Continued)

(56) References Cited

U.S. PATENT DOCUMENTS

| 1,750,607 A * | 3/1930 | Short ..................... B60G 11/12 |
| | | 267/270 |
| 2,414,743 A | 1/1947 | Kaemmerling |

(Continued)

FOREIGN PATENT DOCUMENTS

| CN | 1215458 A | 4/1999 |
| CN | 1380205 A | 11/2002 |

(Continued)

OTHER PUBLICATIONS

International Search Report for International Application No. PCT/DE2016/200233 dated Oct. 27, 2016.

*Primary Examiner* — Christopher P Schwartz
(74) *Attorney, Agent, or Firm* — Brooks Kushman P.C.

(57) ABSTRACT

A bearing bush for a vehicle is disclosed. The bearing bush includes an inner ring, an outer ring, and an elastomer element between the inner and outer rings. An actuator is configured to cause an application of a force on the elastomer element in a radial direction against at least one of the inner ring and outer ring to alter the rigidity of the bearing bushing. This provides a system for mechanically altering the rigidity of the bearing bush, making the bearing bush switchable between at least two rigidity states.

17 Claims, 3 Drawing Sheets

(58) Field of Classification Search
USPC ....... 267/270, 279–283, 141.3, 141.6, 141.7, 267/292–294
See application file for complete search history.

(56) References Cited

U.S. PATENT DOCUMENTS

| | | | | | |
|---|---|---|---|---|---|
| 2,460,292 | A | * | 2/1949 | Nicholas | F16F 1/3935 188/129 |
| 2,482,488 | A | * | 9/1949 | Julien | B61F 5/325 267/292 |
| 2,917,302 | A | * | 12/1959 | Henss | F16F 1/373 267/153 |
| 3,134,585 | A | * | 5/1964 | Trask | F16F 1/40 188/268 |
| 3,279,779 | A | * | 10/1966 | Kloss | F16F 3/12 267/153 |
| 3,322,377 | A | * | 5/1967 | Morlon | F16F 1/3935 267/141.6 |
| 3,411,803 | A | * | 11/1968 | Melton | B62D 7/16 280/93.508 |
| 3,806,106 | A | * | 4/1974 | Hamel | F16F 3/093 267/152 |
| 4,911,417 | A | * | 3/1990 | Short | B60G 7/00 267/141.7 |
| 5,816,587 | A | * | 10/1998 | Stewart | B60G 7/006 280/5.516 |
| 5,924,670 | A | * | 7/1999 | Bailey | F16F 1/3615 188/380 |
| 7,506,862 | B2 | * | 3/2009 | Siemer | B60G 7/02 267/141 |
| 8,240,645 | B2 | * | 8/2012 | Eberhard | B60G 7/006 267/140.12 |
| 9,284,975 | B2 | | 3/2016 | Mitsch | |
| 9,797,445 | B2 | * | 10/2017 | Cordts | F16F 13/20 |
| 2002/0113349 | A1 | | 8/2002 | Rivin | |
| 2006/0220448 | A1 | * | 10/2006 | Hartel | F16F 13/28 303/11 |
| 2018/0209478 | A1 | * | 7/2018 | Krehmer | F16C 27/063 |

FOREIGN PATENT DOCUMENTS

| | | |
|---|---|---|
| DE | 923149 A1 | 1/1991 |
| DE | 4036538 A1 | 5/1992 |
| DE | 69622141 T2 | 11/2002 |
| DE | 10237439 A1 | 3/2003 |
| DE | 10302790 B3 | 7/2004 |
| DE | 102006030967 A1 | 1/2008 |
| DE | 102007012772 A1 | 10/2008 |
| DE | 102007026471 A1 | 12/2008 |
| DE | 102009041022 A1 | 3/2011 |
| GB | 1025402 | 4/1996 |
| JP | 0520985 A | 8/1993 |
| JP | 2005127386 A | 5/2005 |
| WO | 2012119748 A1 | 9/2012 |

* cited by examiner

SWITCHABLE BEARING BUSH FOR A MOTOR VEHICLE

CROSS-REFERENCE TO RELATED APPLICATIONS

This application is the U.S. National Phase of PCT/DE2016/200233 filed May 17, 2016, which claims priority to DE 102015215426.2 filed Aug. 13, 2015, the entire disclosures of which are incorporated by reference herein.

TECHNICAL FIELD

This disclosure relates to a bearing bushing for a motor vehicle, comprising an inner ring and an outer ring, as well as an elastomer element disposed radially between the inner ring and the outer ring, wherein the bearing bushing can be switched between at least to rigidity states.

BACKGROUND

The construction and the operating data of bearing bushings resulting therefrom that are used in a chassis of a motor vehicle have a strong impact on the driving and steering characteristics of the motor vehicle. Relatively minor modifications to a spring constant or rigidity of the bearing bushing can have significant effects on the vehicle characteristics, such as the under- and oversteering behavior as well as chassis noises, vibrations and operating resistances. Depending on the setting of the bearing bushing, the motor vehicle has a relatively "soft" or a relatively "hard" operating behavior.

Different bearing bushings in the chassis of a motor vehicle are known from the generally known prior art. On one hand, purely mechanical bearing bushings or rubber bearings are known, which have a defined rigidity. On the other hand, hydraulically dampened chassis bushings having a predefined or variable rigidity are known. Moreover, bearings with magnetorheological liquids or magnetorheological elastomers are known, wherein the rigidity can be varied via a magnetic field.

By way of example, DE 696 22 141 T2 discloses a method for the production and use of a suspension bushing with variable rigidity for controlling the relative movement between a suspension arm in a motor vehicle and a frame component of the motor vehicle. The suspension bushing has a variable rigidity, which is obtained in that a magnetorheological elastomer or gel is enclosed therein, the rigidity of which can be varied over a wide range by means of an adjustable magnetic field. The variably adjustable magnetic field is generated by means of an electromagnet structure, which is fully integrated in a suspension bushing structure as part of the structure.

The object of this disclosure is to create a bearing bushing for a motor vehicle, the rigidity of which can be mechanically adjusted, and thus is not based on a hydraulic or magnetorheological operating principle.

SUMMARY

According to one embodiment, the bearing bushing is configured to introduce a preloading force into the elastomer element. In other words, through the introduction of a preloading force into the elastomer element, the rigidity of the bearing bushing is increased. Thus, the bearing bushing has a minimum rigidity in a first setting, wherein the elastomer element experiences a minimum preloading force, and thus exhibits a maximum deformation potential. On the other hand, the bearing bushing has a maximum rigidity in a second setting, wherein the elastomer element experiences a maximum preloading force, and exhibits a minimum deformation potential. Numerous switching settings may be possible between the first setting and the second setting, wherein the preloading force acting on the elastomer element can be adjusted in a variable manner.

BRIEF DESCRIPTION OF THE DRAWINGS

Further measures for improvement shall be explained below in greater detail, together with the descriptions of exemplary embodiments based on the figures. Therein.

DETAILED DESCRIPTION OF THE DRAWINGS

Figure 1:
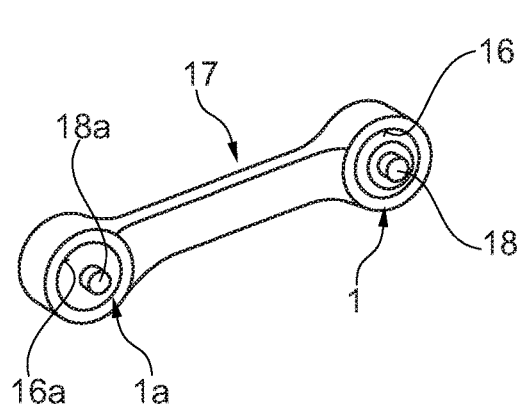
FIG. 1 shows a perspective illustration of a chassis connecting rod for a motor vehicle, wherein the chassis arm has a bearing bushing according to various embodiments described herein.

According to FIG. 1, a bearing bushing 1 is disposed in a borehole 16 provided for this in a chassis connecting rod 17. The chassis connecting rod 17 is incorporated in a chassis—not shown here—of a motor vehicle—not shown here. A cross member—not shown here—of the motor vehicle is attached to a bolt 18 of the bearing bushing 1. Furthermore, the chassis connecting rod 17 has a second borehole 16a, in which a mechanical, non-variable bearing bushing 1a is disposed. In other words, the bearing bushing 1a is in the form of a conventional rubber bearing. A wheel mount—not shown here—is disposed on a bolt 18a of the bearing bushing 1a.

Figure 2:
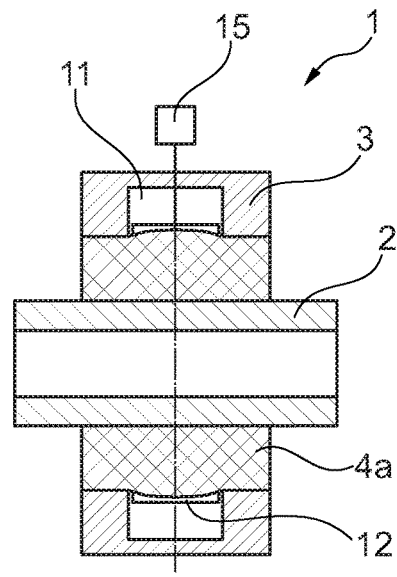
FIG. 2 shows a schematic sectional view, illustrating the construction of the bearing bushing according to a first exemplary embodiment.

According to an embodiment illustrated in FIG. 2, the bearing bushing 1 has an inner ring 2 and an outer ring 3, as well as a non-rotating elastomer element 4a, disposed radially between the inner ring 2 and the outer ring 3. Furthermore, a circumferential groove 11 is formed on an inner circumferential surface of the outer ring 3, in which an annular clamping element 12 is disposed. The diameter of the annular clamping element 12 can be reduced, in order to apply a preloading force to the elastomer element 4a. In other words, by reducing the diameter of the clamping element 12, the preloading force to the elastomer element 4a is increased. An enlargement of the diameter of the clamping element 12 does not reduce the preloading force to the elastomer element 4a, but instead causes the elastomer element 4a to flow into the circumferential groove 11, even when the bearing bushing 1 is subjected to a load, by means of which the rigidity of the bearing bushing 1 is further reduced. An actuator 15 acts on the annular clamping element 12 in order to change the diameter of the annular clamping element 12.

Figure 3:
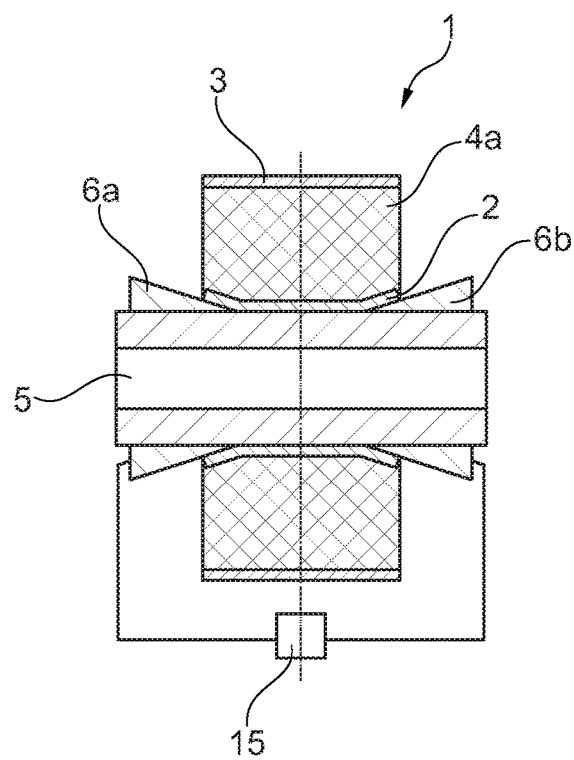
FIG. 3 shows a schematic sectional view, illustrating the construction of the bearing bushing according to a second exemplary embodiment.

According to an embodiment illustrated in FIG. 3, the bearing bushing 1 has an inner ring 2 and an outer ring 3, as well as a non-rotating elastomer element 4a, disposed radially between the inner ring 2 and the outer ring 3. Furthermore, the inner ring 2 is disposed on a sleeve 5. Moreover, a first and second axially moveable tapered ring 6a, 6b are disposed on the sleeve 5, for introducing the preloading force into the elastomer element 4a. The respective tapered ring 6a, 6b lies, at least in part, radially between the inner ring 2 and the sleeve 5. With an axial displacement of the two tapered rings 6a, 6b toward one another, the inner ring 2 experiences a radial expansion. For this, the inner ring 2 is designed such that it is radially elastic. In particular, the inner ring 2 has numerous recesses—not shown here—in order to obtain an elastic deformation. Moreover, the inner ring 2 has a particularly thin-walled design. For an axial displacement of the two tapered rings 6a, 6b, the two tapered rings 6a, 6b are connected to an actuator 15.

Figure 4:
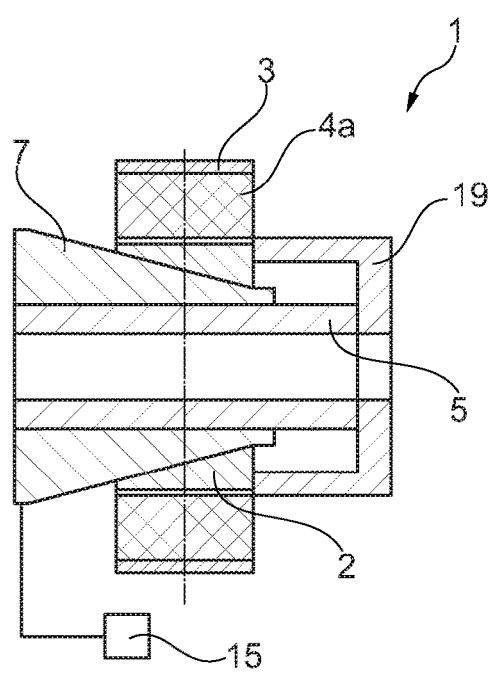
FIG. 4 shows a schematic sectional view, illustrating the construction of the bearing bushing according to a third exemplary embodiment.

According to an embodiment illustrated in FIG. 4, the bearing bushing 1 has an inner ring 2 and an outer ring 3, as well as a non-rotating elastomer element 4a, disposed radially between the inner ring 2 and the outer ring 3. The inner ring 2 has a tapered design, and is disposed on a tapered sleeve 7, such that it can be radially expanded. The tapered sleeve 7 is disposed on a sleeve 5 such that it can be displaced axially. Furthermore, a sleeve element 19 is supported axially on the inner ring 2, in order to secure it axially, when the tapered sleeve 7 is displaced axially. An axial displacement of the tapered sleeve 7 thus results in a radial expansion of the inner ring 2. For this, the inner ring 2 is formed such that it is radially elastic, and has numerous cavities—not shown here—distributed, in particular, over the entire circumferential surface. An expansion of the inner ring 2 results in a compression of the elastomer element 4a between the outer ring 3 and the inner ring 2. As a result, the preloading force to the elastomer element 4a is increased, thus also increasing the rigidity of the bearing bushing 1. An actuator 15 acts on the tapered sleeve 7 for an axial displacement of the tapered sleeve 7.

Figure 5A:
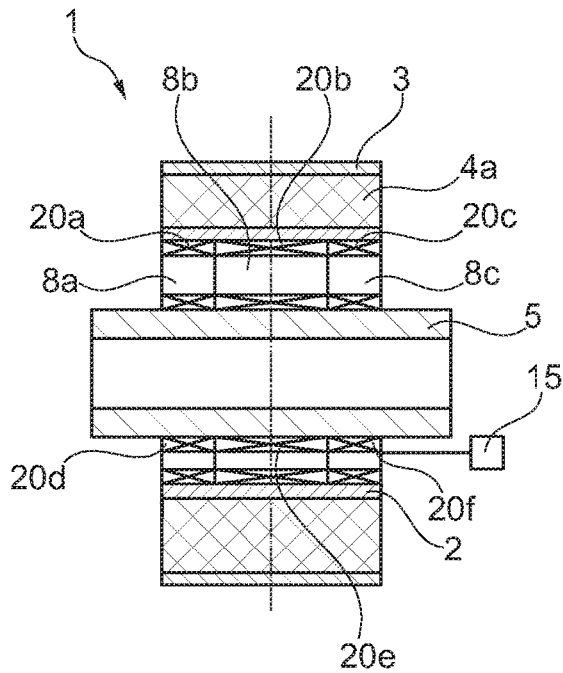
FIG. 5a shows a schematic sectional view, illustration the construction of the bearing bushing according to a fourth exemplary embodiment, wherein the bearing bushing exhibits a low rigidity.
Figure 5B:
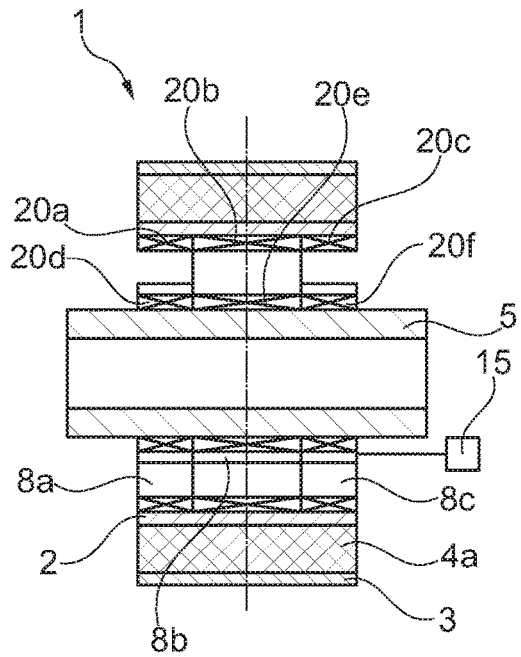
FIG. 5b shows a schematic sectional view of the bearing bushing according to FIG. 5a, wherein the bearing bushing exhibits a high rigidity.

According to an embodiment illustrated in FIGS. 5a and 5b, the bearing bushing 1 has an inner ring 2 and an outer ring 3, as well as an elastomer element 4a disposed radially between the inner ring 2 and the outer ring 3. Furthermore, three eccentric rings 8a, 8b, 8c are disposed radially between a sleeve 5 and the inner ring 2, such that they can rotate via bearing elements 20a-20f. The bearing elements 20a-20c are disposed thereby on an inner circumferential surface of the inner ring 2, and the bearing elements 20d-20f are disposed on an outer circumferential surface of the sleeve 5. When the two eccentric rings 8a and 8c are rotated in relation to the eccentric ring 8b disposed radially therebetween, a radial expansion of the inner ring 2 takes place. For this, the inner ring 2 is elastic and has numerous cavities—not shown here—distributed over the entire circumferential surface. An expansion of the inner ring 2 results in a radial compression of the elastomer element 4a toward one side, and thus in a direction-dependent increase in the preloading force to the elastomer element 4a. According to FIG. 5a, the bearing bushing 1 has a minimum rigidity in this first setting. The elastomer element 4a is not compressed by the eccentric rings 8a-8c thereby. By way of comparison, in FIG. 5b the bearing bushing 1 is shown in the second setting. In accordance with the second setting, the bearing bushing 1 exhibits a maximum rigidity, wherein the elastomer element 4a experiences a maximum compression. Furthermore, the inner ring 2 assumes an oval shape in the second setting.

Figure 6A:
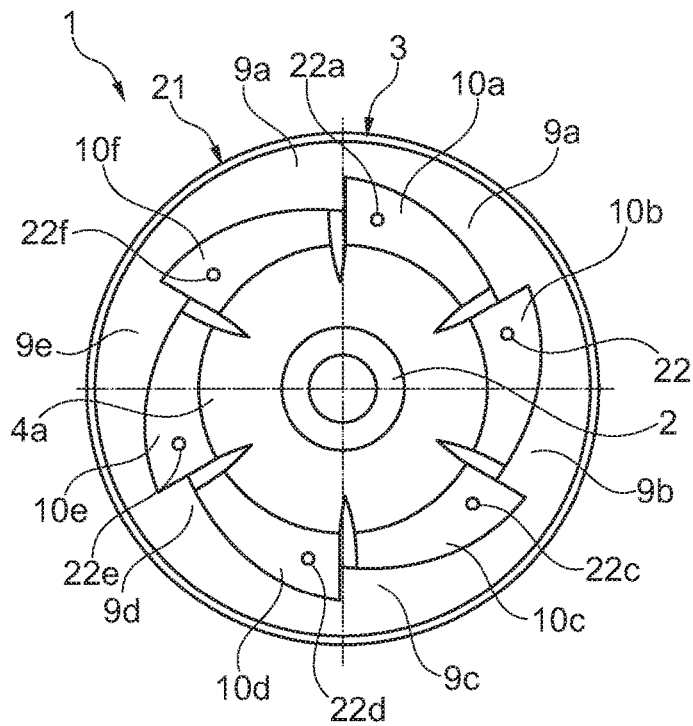
FIG. 6a shows a schematic side view, illustrating the construction of the bearing bushing according to a fifth exemplary embodiment.
Figure 6B:
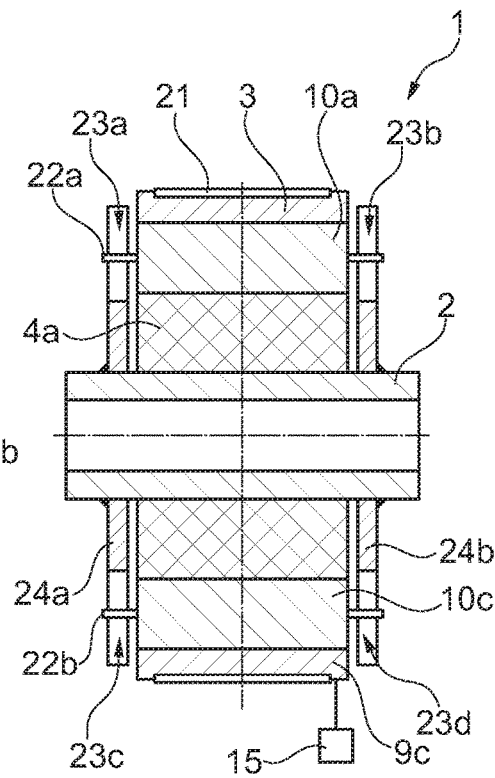
FIG. 6b shows a schematic sectional view of the bearing bushing according to FIG. 6a, FIG. 7 shows a schematic sectional view, illustrating the construction of the bearing bushing according to a sixth exemplary embodiment.

According to an embodiment illustrated in FIGS. 6a and 6b, the bearing bushing 1 has an inner ring 2 and an outer ring 3, as well as an elastomer element 4a disposed radially between the inner ring 2 and the outer ring 3. Furthermore, six tapered elements 10a-10f are disposed between the elastomer element 4a and the outer ring 3, which interact with respective ramps 9a-9f on an inner circumferential surface of the outer ring 3. When the tapered elements 10a-10f interact with the respective ramps 9a-9f, the respective tapered elements 10a-10f move radially, due to a rotational movement of the outer ring 3. The radial movement of the tapered elements 10a-10f results in a compression of the axially slotted elastomer element 4a. In order to prevent a rotation of the tapered elements 10a-10f on the elastomer element 4a, the tapered elements 10a-10f may be vulcanized onto the elastomer element 4a, and also guided radially. For this, a respective bolt 22a-22f is inserted through the respective tapered element 10a-10f, wherein the respective bolt 22a-22f is radially guided into a respective groove 23a-23g on the washers 24a, 24b shown in FIG. 6b. In addition, the bolts 22a-22f move exclusively in the radial direction. In order to implement a rotation of the outer ring 3 in relation to the inner ring 2, the outer ring 3 has a sliding bearing bushing 21 on an outer circumferential surface, wherein the outer ring 3 is connected to an actuator 15.

Figure 7:
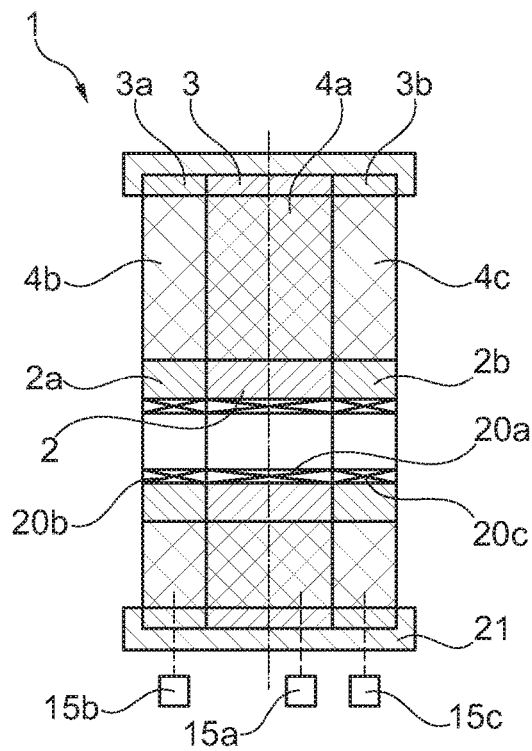

According to an embodiment illustrated in FIG. 7, the bearing bushing 1 has an inner ring 2 and an outer ring 3, as well as a non-rotating elastomer element 4a disposed radially between the inner ring 2 and the outer ring 3. Furthermore, respective further inner rings 2a, 2b and outer rings 3a, 3b, as well as non-rotating elastomer elements 4b, 4c disposed radially between the respective inner rings 2a, 2b and the respective outer rings 3a, 3b, are disposed axially adjacent thereto. The three outer rings 3, 3a, 3b are rotatably supported on a sliding bearing bushing 21. Furthermore, the elastomer elements 4a-4c have an eccentric design, and can rotate independently. A rotation of the elastomer elements 4a-4c results in a radial compression of the respective elastomer elements 4a-4c, and thus in a direction-dependent increase in the preloading force to the respective elastomer element 4a-4c. In order to implement a direction-dependent increase in the preloading force to the respective elastomer element 4a-4c, the elastomer element 4a may be rotated 90° clockwise, together with the non-rotating outer ring 3 disposed thereon and the non-rotating inner ring 2 disposed thereon, wherein the elastomer elements 4b and 4c are rotated 90° counter-clockwise, together with the respective outer ring 3a, 3b and the respective inner ring 2a, 2b. As a result, the central axis is displaced upward, wherein it actively engages in the axle kinematics. The respective inner rings 2, 2a, 2b are rotatably supported via respective bearing elements 20a-20c. Furthermore, the respective elastomer elements 4a-4c interact with respective actuators 15a-15c.

Figure 8:
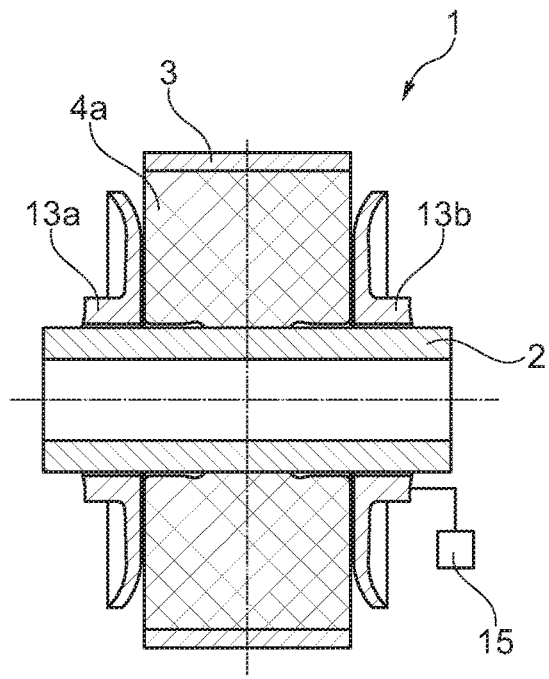
FIG. 8 shows a schematic sectional view, illustrating the construction of the bearing bushing according to a seventh exemplary embodiment.

According to an embodiment illustrated in FIG. 8, the bearing bushing 1 has an inner ring 2 and an outer ring 3, as well as a non-rotating elastomer element 4a, disposed radially between the inner ring 2 and the outer ring 3. Furthermore, a first and a second washer 13a, 13b are disposed on the inner ring 2 such that they can move axially, wherein the two washers 13a, 13b can be displaced axially against the elastomer element 4a via an actuator 15, in order to introduce the preloading force into the elastomer element 4a. In addition, the elastomer element 4a is axially compressed via the two washers 13a, 13b.

Figure 9:
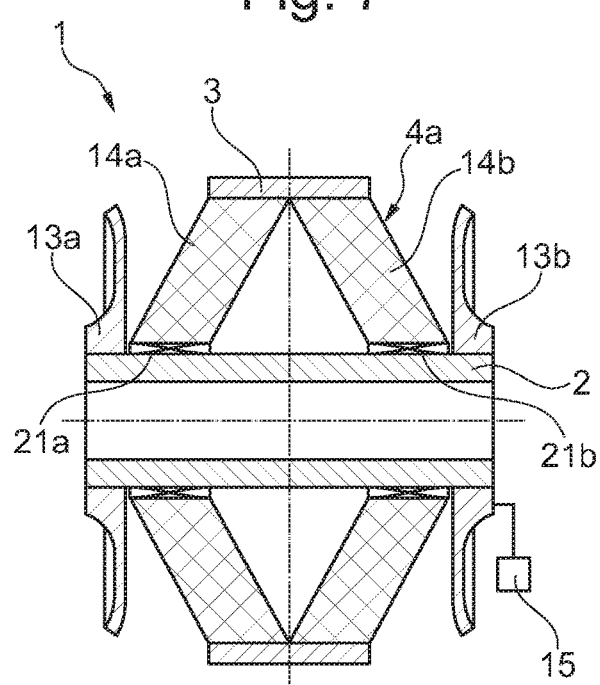
FIG. 9 shows a schematic sectional view, illustrating the construction of the bearing bushing according to an eighth exemplary embodiment.

According to an embodiment illustrated in FIG. 9, the bearing bushing 1 has an inner ring 2 and an outer ring 3, as well as an elastomer element 4a, radially disposed between the inner ring 2 and the outer ring 3. The elastomer element 4a has two legs 14a and 14b, which are axially spaced apart on an inner circumferential surface of the elastomer element 4a in a first setting—not shown here. The two legs 14a, 14b can be displaced axially on the inner ring 2 via a respective sliding bushing 21a, 21b disposed thereon. Moreover, an outer circumferential surface of the elastomer element 4a is non-rotatably disposed on the outer ring 3. In order to change the rigidity of the bearing bushing 1, two washers 13a, 13b are disposed on the inner ring 2 such that they can move axially, in order to axially compress the elastomer element 4a. The legs 14a, 14b are thus moved toward one another by an actuator 15, by means of which the preloading force to the elastomer element 4a is increased. A change in the rigidity is also obtained by modifying the exposed, unloaded surfaces of the elastomer element 4a, where an expansion is possible. In the initial state, the elastomer element 4a has numerous unloaded surfaces, and is therefore relatively flexible. At its maximum rigidity, when the two legs 14a, 14b are in axial contact with one another, on one hand, and on the other hand, axially loaded by the two washers 13a, 13b, there are substantially no more exposed surfaces on the elastomer element 4a.

Figure 10:
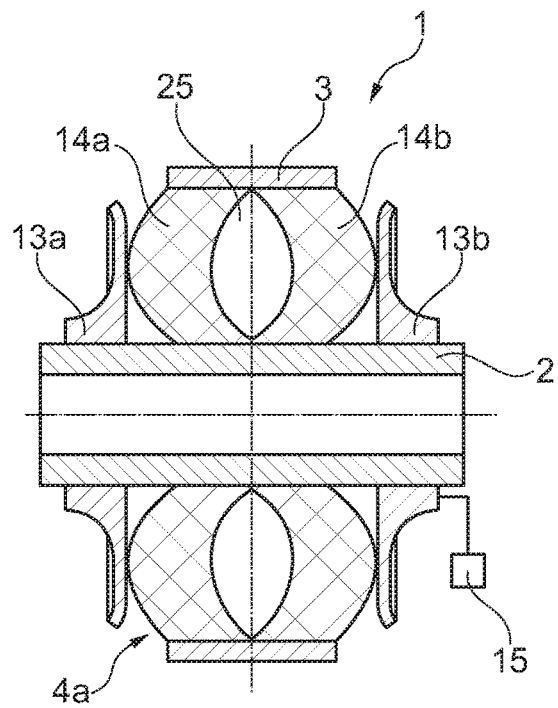
FIG. 10 shows a schematic sectional view, illustrating the construction of the bearing bushing according to a ninth exemplary embodiment.

According to an embodiment illustrated in FIG. 10, the bearing bushing 1 has an inner ring 2 and an outer ring 3, as well as a non-rotating elastomer element 4a, disposed radially between the inner ring 2 and the outer ring 3. The elastomer element 4a has two legs 14a, 14b, wherein the two legs 14a, 14b are bowed, such that the two legs 14a, 14b are at least in part axially spaced apart from one another. As a result, an axial, lens-shaped hollow space is formed between the two legs 14a, 14b. Furthermore, two washers 13a, 13b are disposed on the inner ring 2 such that they can move axially, wherein the two washers 13a, 13b can be displaced axially against the respective leg 14a, 14b in order to introduce the preloading force into the elastomer element 4a.

For this embodiment, an actuator acts on the two washers 13a, 13b. Here as well, a change in the rigidity is obtained, in the same manner as in FIG. 9, by modifying the exposed, unloaded surfaces of the elastomer element 4a where an expansion is possible.

LIST OF REFERENCE SYMBOLS 1, 1a bearing bushing
2 inner ring
3 outer ring
4a-4c elastomer element
5 sleeve
6a, 6b tapered ring
7 tapered sleeve
8a, 8b eccentric ring
9a-9d ramps
10a, 10b tapered element
11 groove
12 clamping element
13a, 13b washer
14a, 14b leg
15 actuator
16, 16a borehole
17 chassis connecting rod
18, 18a bolt
19 sleeve element
20a-20f bearing element
21 sliding bearing bushing
22a-2f bolt
23a-23d groove
24a, 24b washer
25 hollow space

The invention claimed is:

1. A bearing bushing for a motor vehicle, comprising:
an inner ring;
an outer ring; and
an elastomer element disposed radially between the inner ring and the outer ring, wherein the bearing bushing can be switched between at least two rigidity states, and wherein the bearing bushing is configured to introduce a preloading force into the elastomer element;
wherein the inner ring is radially elastic, and is disposed on a sleeve via at least two eccentric rings, wherein the at least two eccentric rings are rotatably disposed between the inner ring and the sleeve in order to introduce the preloading force into the elastomer element.

2. The bearing bushing according to claim 1, wherein the inner ring has a tapered and radially elastic design, wherein the sleeve can move axially, in order to introduce the preloading force into the elastomer element, and wherein the inner ring is axially fixed in place, at least at one side.

3. The bearing bushing according to claim 1, wherein the outer ring has numerous ramps on an inner circumferential surface, wherein the respective ramps interact radially with a respective tapered element, non-rotatably disposed on the elastomer element.

4. The bearing bushing according to claim 1, wherein the outer ring has a circumferential groove on an inner circumferential surface, wherein an annular clamping element is disposed in the groove, and wherein a diameter of the annular clamping element can be reduced, in order to introduce the preloading force into the elastomer element.

5. The bearing bushing according to claim 1, wherein the elastomer element has an eccentric design, wherein at least one further eccentric elastomer element is disposed axially adjacent to the elastomer element, and wherein the elastomer element and the at least one further eccentric elastomer element can rotate independently of one another, in order to introduce the preloading force into at least the one elastomer element.

6. The bearing bushing according to claim 1, wherein a first and second washer are disposed on the inner ring such that they can move axially, wherein the first and second washers can be displaced axially against the elastomer element in order to introduce the preloading force into the elastomer element.

7. The bearing bushing according to claim 6, wherein the elastomer element has two legs which are at least in part spaced apart from one another.

8. The bearing bushing according to claim 1, further comprising at least one actuator for changing the rigidity of the bearing bushing.

9. A bearing bushing for a vehicle, comprising:
an inner ring;
an outer ring;
an elastomer element disposed radially between the inner ring and the outer ring; and
an actuator configured to cause an application of a force on the elastomer element in a radial direction against at least one of the inner ring and outer ring to alter a rigidity of the bearing bushing;
wherein the outer ring includes an inner surface defining a circumferential groove, wherein the bearing bushing includes a clamp located in the circumferential groove, and wherein the actuator is configured to force the clamp radially inward to increase the rigidity of the bearing bushing.

10. The bearing bushing of claim 9, further comprising an axially-displaceable ring coupled to the actuator and configured to displace along a central axis of the bearing bushing.

11. The bearing bushing of claim 10, wherein the axially-displaceable ring is tapered such that axial displacement of the axially-displaceable ring causes radial compression of the elastomer element to increase the rigidity of the bearing bushing.

12. The bearing bushing of claim 11, wherein the inner ring is disposed about a sleeve, and the inner ring is radially elastic such that the inner ring deforms radially as the axially-displaceable ring displaces along the central axis.

13. The bearing bushing of claim 10, wherein the axially-displaceable ring is a washer abutting an axial side of the elastomer element, and axial displacement of the washer compresses the elastomer element in an axial direction.

14. The bearing bushing of claim 13, further comprising a second ring abutting an opposite axial side of the elastomer element.

15. The bearing bushing of claim 10, wherein the elastomer element includes two legs axially spaced apart and converging toward one another.

16. A bearing bushing for a motor vehicle, comprising:
an inner ring;
an outer ring; and
an elastomer element disposed radially between the inner ring and the outer ring, wherein the bearing bushing can be switched between at least two rigidity states, and wherein the bearing bushing is configured to introduce a preloading force into the elastomer element;
wherein the outer ring has numerous ramps on an inner circumferential surface, wherein the respective ramps interact radially with a respective tapered element, non-rotatably disposed on the elastomer element.

17. The bearing bushing of claim 16, wherein the outer ring has a circumferential groove on an inner circumferential surface, wherein an annular clamping element is disposed in the groove, and wherein a diameter of the annular clamping element can be reduced, in order to introduce the preloading force into the elastomer element.

* * * * *